US012724380B2

(12) United States Patent
Gotoda et al.

(10) Patent No.: US 12,724,380 B2
(45) Date of Patent: Sep. 1, 2026

(54) PRINTER AND INTEGRATED LIGHT SOURCE MODULE THEREOF

(71) Applicant: AVISION INC., Hsinchu (TW)

(72) Inventors: Katsuhiko Gotoda, Hsinchu (TW); Min-Tung Huang, Hsinchu (TW); Sung Po Cheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 19/032,461

(22) Filed: Jan. 21, 2025

(65) Prior Publication Data

US 2025/0251694 A1 Aug. 7, 2025

(30) Foreign Application Priority Data

Feb. 7, 2024 (TW) ................................ 113105057

(51) Int. Cl.

| | |
|---|---|
| ***G03G 15/04*** | (2006.01) |
| ***G03G 15/01*** | (2006.01) |
| ***G03G 21/16*** | (2006.01) |

(52) U.S. Cl.

CPC ....... *G03G 21/1619* (2013.01); *G03G 15/011* (2013.01); *G03G 15/0121* (2013.01); *G03G 15/0178* (2013.01); *G03G 21/1638* (2013.01); *G03G 21/1647* (2013.01); *G03G 2221/169* (2013.01)

(58) Field of Classification Search

CPC ............. G03G 15/011; G03G 15/0121; G03G 15/0178; G03G 21/1619; G03G 21/1638; G03G 21/1647

USPC .......................................... 399/107, 110, 114

See application file for complete search history.

(56) References Cited

U.S. PATENT DOCUMENTS 9,429,901 B2 * 8/2016 Okabe ................ G03G 21/1666
2012/0219314 A1 8/2012 Nozaki et al.
2020/0356042 A1 11/2020 Matsuo et al.

FOREIGN PATENT DOCUMENTS

CA 2851099 A1 * 1/2013
CN 1713086 A 12/2005
JP 2005077440 A * 3/2005

* cited by examiner

*Primary Examiner* — Hoan H Tran

(57) ABSTRACT

The present disclosure provides a printer and integrated light source module thereof, comprising a chassis, a light source integration module, and a cover assembly. A receptacle within the chassis facilitates the placement of the light source integration module. This module comprises a photosensitive component, a light source component, and several toner cartridges. The light source component is positioned amidst the spaces of these toner cartridges. The cover assembly is affixed to the chassis, sealing the receptacle of the chassis and situated atop the aforementioned toner cartridges. The present invention is characterized by its integrated design, where the light source component is situated within the assembly gap between the photosensitive component and the toner cartridges, thereby forming an easily assembled and disassembled light source integration module. This innovation enhances the internal structural design of the printer, facilitating assembly, maintenance, and disassembly.

12 Claims, 10 Drawing Sheets

PRINTER AND INTEGRATED LIGHT SOURCE MODULE THEREOF

CROSS REFERENCE TO RELATED APPLICATION

This application claims the priority benefit of Taiwan Patent Application Serial Number 113105057, filed on Feb. 7, 2024, the full disclosure of which is incorporated herein by reference.

BACKGROUND OF THE INVENTION

1. Field of the Invention

The present invention relates to the technical field of the printer, and particularly to a printer based on an internal space structural design and its integrated light source module.

2. Description of the Related Art

In existing technology, a printer comprises a chassis, a photosensitive component, a light source component, and a plurality of toner cartridges. The chassis has a receptacle. The photosensitive component, the light source component, and the plurality of toner cartridges are respectively installed in the receptacle. The photosensitive component includes a photosensitive drum, the light source component includes a light source unit (such as an LED or laser), and each toner cartridge includes a toner and a development roller. The light source unit of the light source component exposes the image to be printed onto the photosensitive drum. The development roller of the toner cartridge applies toner to the exposed surface of the photosensitive drum. Finally, the toner on the surface of the photosensitive drum is transferred onto the paper.

In the current printer structure, the plurality of photosensitive drums of the photosensitive component are evenly disposed, and each toner cartridge is corresponded to each photosensitive drum. The light source component is located at the inner bottom of the cover plate, and the light source component is corresponded to the positions of each of the photosensitive drums. When the cover plate of the printer covers the chassis, each of the light source units of the light source component are correspondingly positioned between each toner cartridge, which means that each light source component is corresponded to each photosensitive drum such that the light source unit is exposed to the drums. It should be noted that in current printers, placing the light source inside the cover plate not only results in poor utilization of internal space but also creates difficulties in maintenance such as removing paper jams.

Furthermore, during the process of the cover plate covering the chassis, because the toner cartridges are inside the receptacle and the light source component at the bottom of the cover has a poor structural design, there is a high probability that the cover cannot be closed smoothly. This issue is often resolved by reducing the size of the toner cartridges to create more space for the light source component to move, but this also reduces the amount of toner each cartridge can store, leading to frequent cartridge replacements. Additionally, if a paper jam occurs, the design should better facilitate removal. Therefore, there is indeed a need for improved solutions to address these problems in current technology.

SUMMARY OF THE INVENTION

In view of the above-mentioned shortcomings of the prior art, the main purpose of the current invention is to provide a printer and an integrated light source module which can solve the problem of the poor internal structural design of the existing printer.

In order to achieve the above purpose, a technical means adopted by the present invention is to make the aforementioned printer include:

- a chassis, including a receptacle;
- a photosensitive component, located in the receptacle, wherein the photosensitive component includes a plurality of photosensitive drums and a photosensitive frame, and the plurality of photosensitive drums are disposed on the photosensitive frame;
- a light source component, located on the photosensitive component, wherein the light source component includes a plurality of light source units and a light source frame, the plurality of light source units are evenly disposed on the light source frame, and the plurality of light source units are respectively corresponded to the plurality of photosensitive drums;
- a plurality of toner cartridges, inserted into a plurality of spaces in the photosensitive component and the light source component, wherein the plurality of toner cartridges are respectively corresponded to the plurality of photosensitive components and the plurality of light source components;
- a cover assembly, located on the chassis, wherein the cover assembly covers the receptacle and the cover assembly is located above the plurality of toner cartridges.

Furthermore, the photosensitive frame includes a grip unit, two side panel frames and a fixing frame, wherein two ends the grip unit are respectively fixed to one end of the two side panel frames, two ends of the fixing frame are respectively fixed to the other end of the two side panel frames, two ends of each of the plurality of photosensitive drums are located on the two side panel frames, the plurality of photosensitive drums are located between the grip unit and the fixing frame, and the plurality of photosensitive drums are separated by a first gap.

Furthermore, the light source frame further includes a first frame and two second frames, wherein two ends of the first frame are respectively fixed to one end of the two second frames, two ends of each of the plurality of light source units are located on the two second frames, the plurality of light source units are located on one side of the first frame, and the plurality of light source units are separated by a second gap.

Furthermore, the first gap and the second gap are linked to each other, and one of the plurality of toner cartridges is correspondingly assembled in the first gap and the second gap.

Furthermore, the photosensitive frame further includes a fixing rod, wherein two ends of the fixing rod respectively pass through two ends of the two side panel frames, and the light source frame further includes two hook units, the two hook units are respectively located on two ends of the first frame, and the two hook units of the light source frame are fixed to the two ends of the fixing rod of the photosensitive frame.

Furthermore, the light source frame further includes two gear units; the two gear units are respectively located on two ends of the second frame away from the two hook units, the chassis includes two gear parts, and the two gear units mesh with the two gear parts, wherein the two gear parts limit the rotation of the two gear units, and the light source frame of the light source component maintains a fixed angle relative to a notch of the receptacle.

Furthermore, the cover assembly includes a plate body and two support rods, one side of the plate body is pivotally attached to one side of the chassis, one end of the two support rods is respectively supported on two sides adjacent to the pivot side of the plate body, and the other end of the two support rods is respectively supported on two sides adjacent to the pivot side of the chassis.

Furthermore, to achieve the aforementioned object, another technical approach adopted by the present invention is to make the integrated light source module of the aforementioned printer include:

- a photosensitive component, including a plurality of photosensitive drums and a photosensitive frame, and the plurality of photosensitive drums are disposed on the photosensitive frame;
- a light source component, located on the photosensitive component, the light source component including a plurality of light source units and a light source frame, wherein the plurality of light source units are disposed on the light source frame, and the plurality of light source units are respectively corresponded to the plurality of photosensitive drums; and
- a plurality of toner cartridges, inserted into a plurality of spaces between the photosensitive components and the light source components, wherein the plurality of toner cartridges are respectively corresponded to the plurality of photosensitive components and the plurality of light source components.

Furthermore, the photosensitive frame further includes a grip unit, two side panel frames and a fixing frame, wherein two ends the grip unit are respectively fixed to one end of the two side panel frames, two ends of the fixing frame are respectively fixed to the other ends of the two side panel frames, two ends of each of the plurality of photosensitive drums are located on the two side panel frames, the plurality of photosensitive drums are located between the grip unit and the fixing frame, and the plurality of photosensitive drums are separated by a first gap.

Furthermore, the light source frame further includes a first frame and two second frames, wherein two ends of the first frame are respectively fixed to one end of the two second frames, two ends of each of the plurality of light source units are located on the two second frames, the plurality of light source units are located on one side of the first frame, and the plurality of light source units are separated by a second gap.

Furthermore, the first gap and the second gap are linked to each other, and one of the plurality of toner cartridges is correspondingly assembled in the first gap and the second gap.

Furthermore, the photosensitive frame further includes a fixing rod, wherein two ends of the fixing rod respectively pass through two ends of the two side panel frames, and the light source frame further includes two hook units, wherein the two hook units are respectively located on two ends of the first frame, and the two hook units of the light source frame are fixed to the two ends of the fixing rod of the photosensitive frame.

The present invention, via an integrated design, integrates the light source component within the assembly gap of the photosensitive component and the plurality of toner cartridges, improving the internal structural design of the printer. This integration can avoid the light source component at the bottom of the cover plate being prone to structural problems that prevent it from smoothly closing relative to the toner cartridges in the receptacle. Furthermore, due to the improved internal structural design of the printer, the size of the toner cartridge can be increased, and the integrated design also facilitates easier removal of paper jams.

BRIEF DESCRIPTION OF THE DRAWINGS

The drawings described here are provided to offer a further understanding of the present invention and form a part of it. The illustrative embodiments of the present invention and their descriptions are used to explain the invention and do not constitute an undue limitation of it. In the drawings.

DETAILED DESCRIPTION OF THE PREFERRED EMBODIMENT

Figure 1:
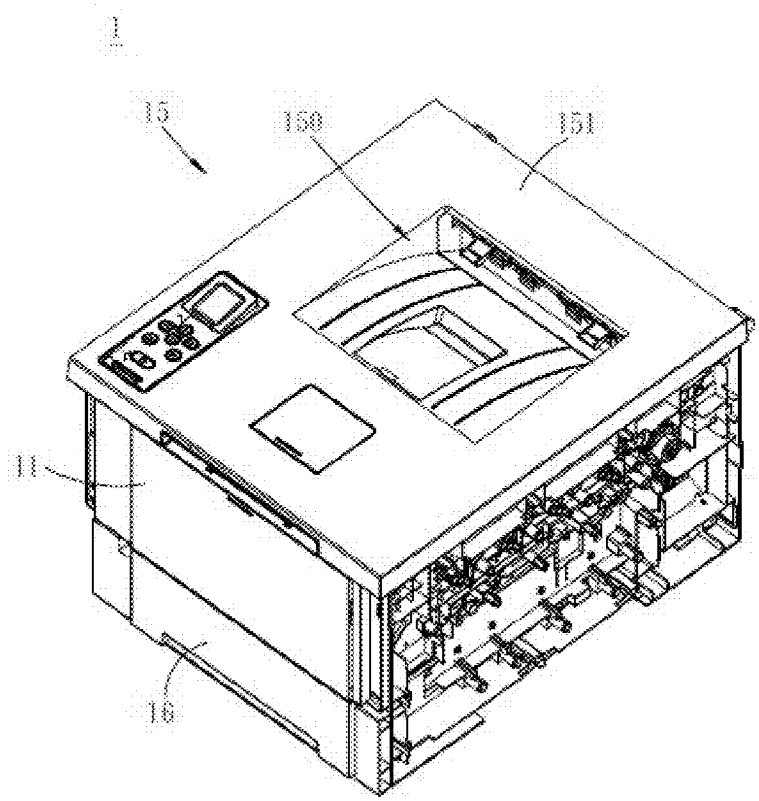
FIG. 1 is a perspective view of the structure of the printer of the present invention.
Figure 2:
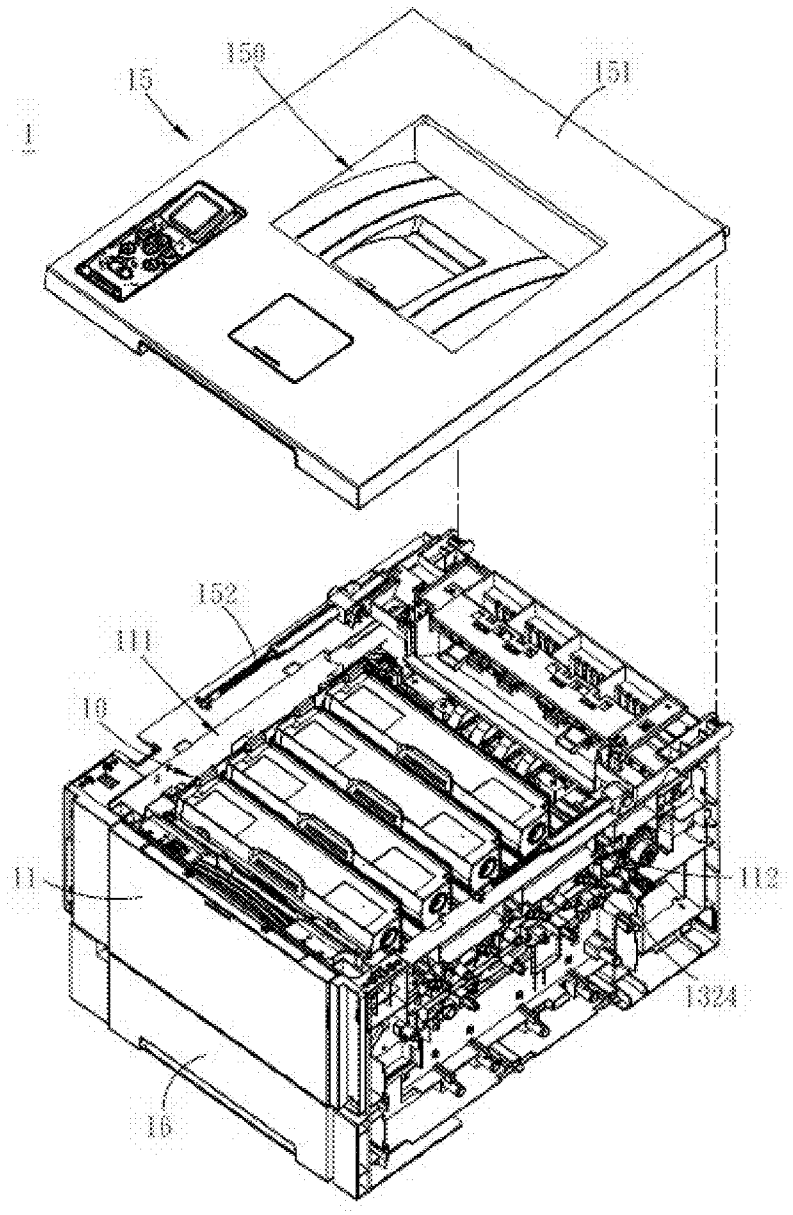
FIG. 2 is an exploded perspective view of the structure of the printer of the present invention.
Figure 3:
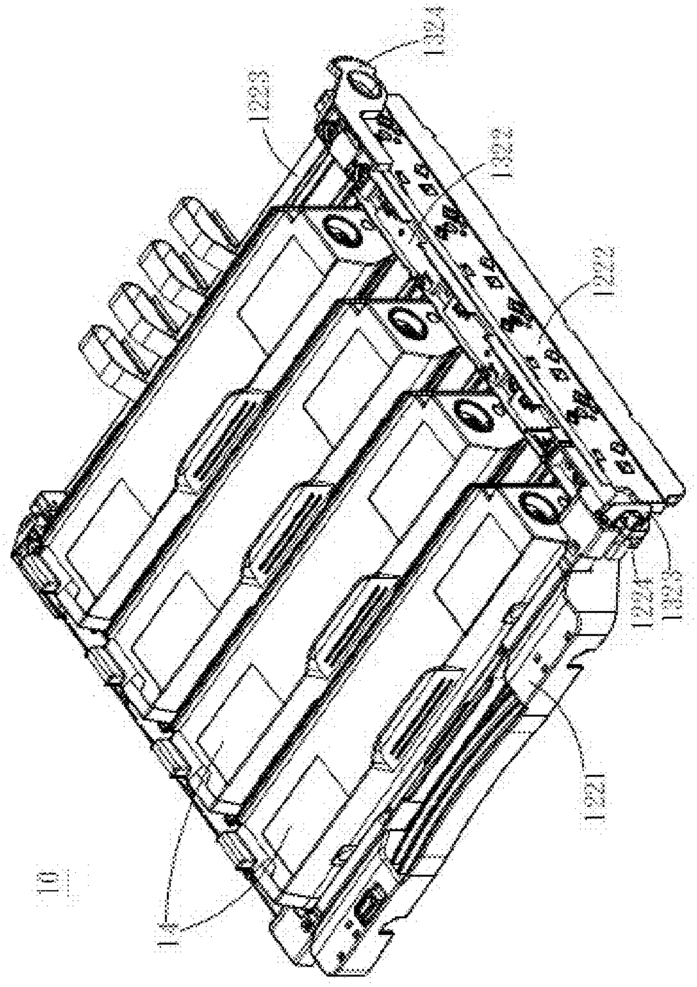
FIG. 3 is a perspective view of a part of the structure of the printer of the present invention.
Figure 4:
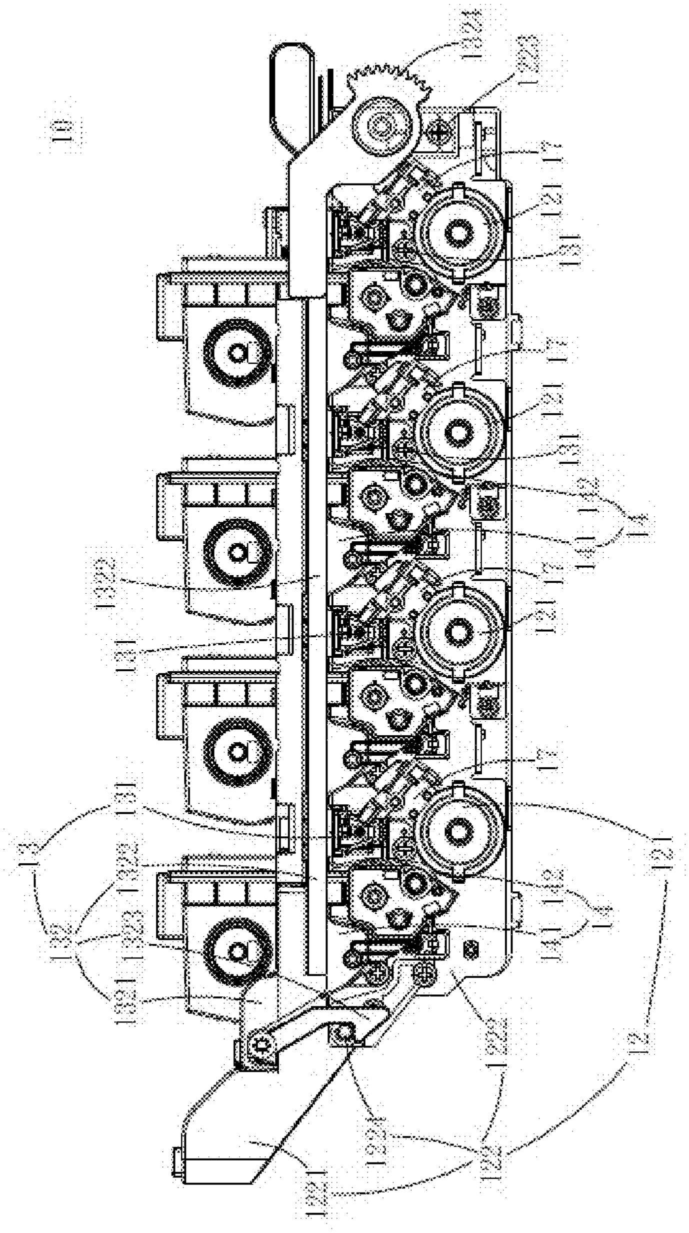
FIG. 4 is a partial cross-sectional side view of the printer of the present invention.
Figure 5:
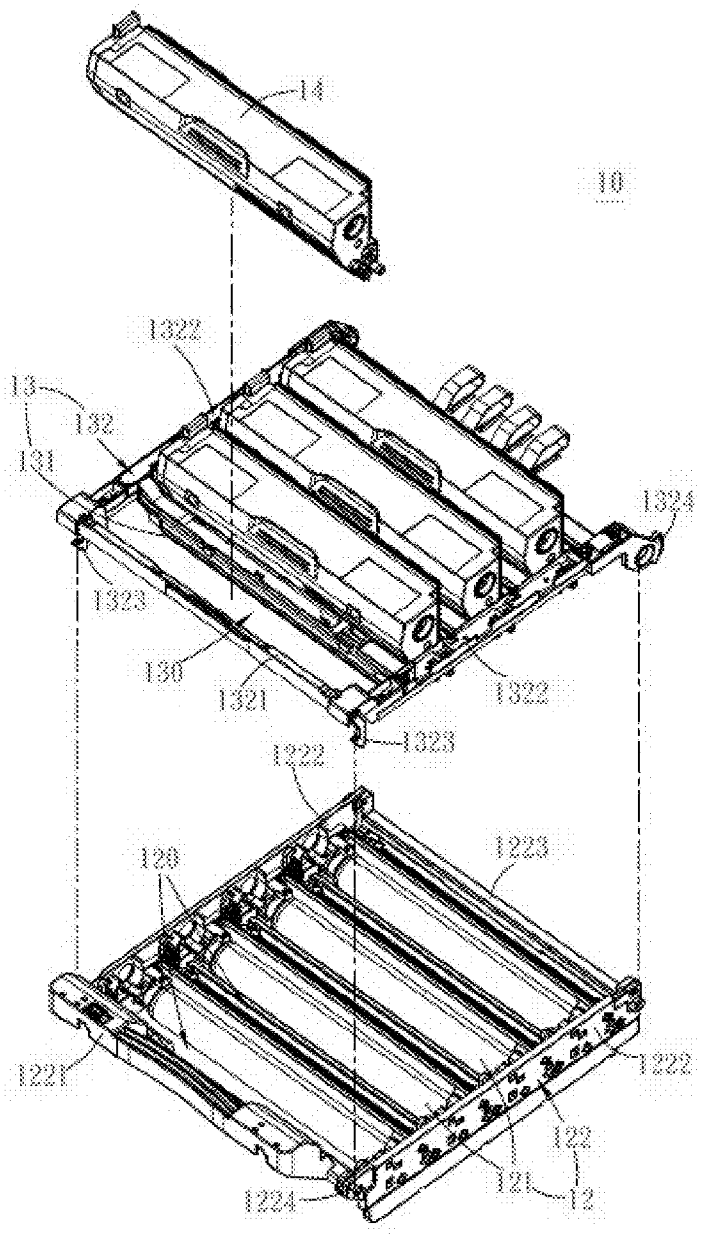
FIG. 5 is an exploded perspective view of a part of the printer of the present invention.
Figure 6:
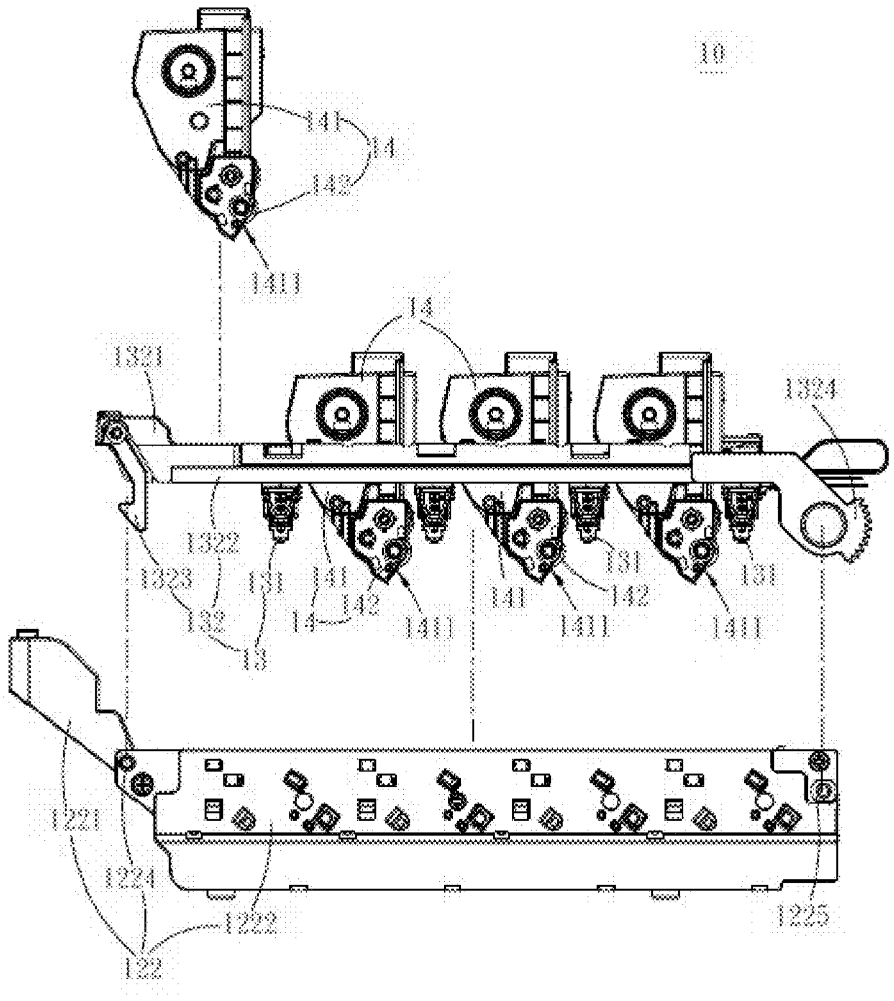
FIG. 6 is an exploded side view of a part of the printer of the present invention.

Regarding the embodiment of the present invention, please refer to FIG. 1 to FIG. 6. FIG. 1 is a structural perspective view of the printer of the present invention, FIG. 2 is an exploded perspective view, FIG. 3 is a partial structural perspective view, FIG. 4 is a partial cross-sectional side view, FIG. 5 is a partial exploded perspective view, and FIG. 6 is a partial exploded side view. As shown in the figures, this embodiment provides a printer 1, which includes a chassis 11, a photosensitive component 12, a light source component 13, a plurality of toner cartridges 14, and a cover assembly 15. The chassis 11 includes a receptacle 111. The photosensitive component 12 is installed in the receptacle 111, and the photosensitive component 12 includes a plurality of photosensitive drums 121 and a photosensitive frame 122. The plurality of photosensitive drums 121 are separated on the photosensitive frame 122. The light source component 13 is installed on the photosensitive component 12, and the light source component 13 includes a plurality of light source units 131 and a light source frame 132. The plurality of light source units 131 are disposed on the light source frame 132, and the plurality of light source units 131 are respectively corresponded to the plurality of photosensitive drums 121. The plurality of toner cartridges 14 are inserted into a plurality of spaces in the photosensitive component 12 and the light source component 13, and the plurality of toner cartridges 14 are respectively corresponded to the plurality of photosensitive drums 121 and the plurality of light source units 131. The cover assembly 15 is installed on the chassis 11, the cover assembly 15 covers the receptacle 111, and the cover assembly 15 is located above the plurality of toner cartridges 14.

Please further refer to FIG. 5 and FIG. 6. In this embodiment, the photosensitive frame 122 further includes a grip unit 1221, two side panel frames 1222, and a fixing frame 1223. Two ends of the grip unit 1221 are respectively fixed to one end of the two side panel frames 1222, and two ends of the fixing frame 1223 are respectively fixed to the other end of the two side panel frames 1222. Two ends of each photosensitive drum 121 are installed on the two side panel frames 1222. The plurality of photosensitive drums 121 are located between the grip unit 1221 and the fixing frame 1223, and the plurality of photosensitive drums 121 are separated by a first gap 120. Additionally, the photosensitive frame 122 includes a fixing rod 1224, and two ends of the fixing rod 1224 pass through two ends of the two side panel frames 1222.

Moreover, in the present embodiment, the plurality of light source units 131 can be separately composed of an LED print head in order to provide the advantages of energy saving, durability and high efficiency; the light source frame 132 further includes a first frame 1321 and two second frames 1322, the two ends of the first frame 1321 are fixed to one end of the two second frames 1322, and two ends of each light source unit 131 are respectively located on two second frames 1322. The plurality of light source units 131 are located on one side of the first frame 1321, and the plurality of light source units 131 are separated by a plurality of second gaps 130. Additionally, the light source frame 132 further includes two hook units 1323, and the two hook units 1323 are respectively located on the two ends of the first frame 1321.

As described above, by engagement of the two hook units 1323 of the light source frame 132 with the two ends of the fixing rod 1224 of the photosensitive frame 122, the light source frame 132 is fixed above the photosensitive frame 122, and the light source unit 131 of the light source frame 132 correspondingly irradiates the photosensitive drum 121 of the photosensitive frame 122. The plurality of first gaps 120 and the plurality of second gaps 130 are linked to each other, and the plurality of toner cartridges 14 is assembled correspondingly in the plurality of first gaps 11 and the plurality of second gaps 12. In other words, the plurality of toner cartridges 14 is located between each combination of light source unit 131 and photosensitive drum 121.

In the present embodiment, by setting the light source component 13 in the assembly gap between the photosensitive component 12 and the toner cartridge 14, the internal structural design of the printer 1 is improved. Thus, the known problem of the bottom of the light source component not being able to smoothly close relative to the toner cartridges in the receptacle of the chassis can be avoided. Furthermore, by improving the internal structural design of the printer 1, the influence of the toner cartridges 14 on the cover assembly 15 covering the receptacle 111 of the chassis 11 can be further reduced, which also allows for an increase in the size of the toner cartridges 14.

Please refer to FIG. 4 and FIG. 6. Each toner cartridge 14 includes a toner storage box 141 and a development roller 142; the toner storage box 141 has a discharge port 1411, and the development roller 142 is pivotally located in the discharge port 1411 of the toner storage box 141. The development roller 142 abuts the surface of each photosensitive drum 121. Furthermore, the printer 1 includes a charging component 17; the charging component 17 is corresponded to one side of the plurality of photosensitive drums 121, and the charging component 17 provides a charge to the surface of the plurality of photosensitive drums 121.

As described above, the receptacle 111 of the chassis 11 has a paper transport path, and the plurality of photosensitive drums 121 is located on the paper transport path. The cover assembly 15 includes a paper output port 150, and the output end of the paper transport path links to the paper output port. Furthermore, the printer 1 further includes a paper storage box 16, a transfer printing roller component, and a heating component. The paper storage box 16 is located at the bottom of the chassis 11, and the paper storage box 16 links to the input end of the paper transport path. The transfer printing roller component is corresponded to one side of the plurality of photosensitive drums 121, wherein the paper transport path passes between the plurality of photosensitive drums 121 and the transfer printing roller component. The heating component is located on the paper transport path, and the heating component is located between the transfer printing roller component and the paper output port 150.

In the present embodiment, the printer 1 mainly executes the following steps. The first step is charging; first, the charging component charges the surface of the photosensitive drum 121 with a positive charge such that the surface of the plurality of photosensitive drums 121 is charged with a positive charge. The second step is exposure; the light from the light source unit 131 of the light source component 13 irradiates the photosensitive drum 121, the positive charge on the surface of the photosensitive drum 121 disappears, and the part of the photosensitive drum 121 surface irradiated by the light source unit 131 is the area to be printed with an image or text. The third step is image formation; the toner in the toner storage box 141 is charged with a positive charge, and the toner is spread on the surface of the plurality of photosensitive drums 121 by the development roller 142. Due to the principle of static electricity, the toner is absorbed in the region of each photosensitive drum 121 that does not have a positive charge (the region irradiated by the light source unit 131), and the region not irradiated by the light source unit 131 remains positively charged and repels the toner. Thus, the aforementioned toner that has been adsorbed on the surface of the plurality of photosensitive drums 121 forms the image or text to be printed.

The fourth step is transfer; the paper is output from the paper storage box 16 to the paper transport path. The paper passes between the plurality of photosensitive drums 121 and the transfer printing roller component, wherein the surface of the transfer printing roller component has a negative charge. The surface of one side of the paper is pressed against the photosensitive drum 121, and the surface of the other side of the paper is pressed against by the rolling pressure of the transfer printing roller component with the negative charge. Thus, the positively charged toner on the photosensitive drum 121 is attracted by the negatively-charged transfer printing roller component and printed on the paper. The fifth step is fixing; the paper with the aforementioned printed toner is pushed through the heating component, and the heating component uses high temperature and high pressure to cause the toner to fuse and become fixed on the fibers of the paper. Finally, the paper with the completed printing is output through the paper output port 150 of the cover assembly 15.

Figure 7:
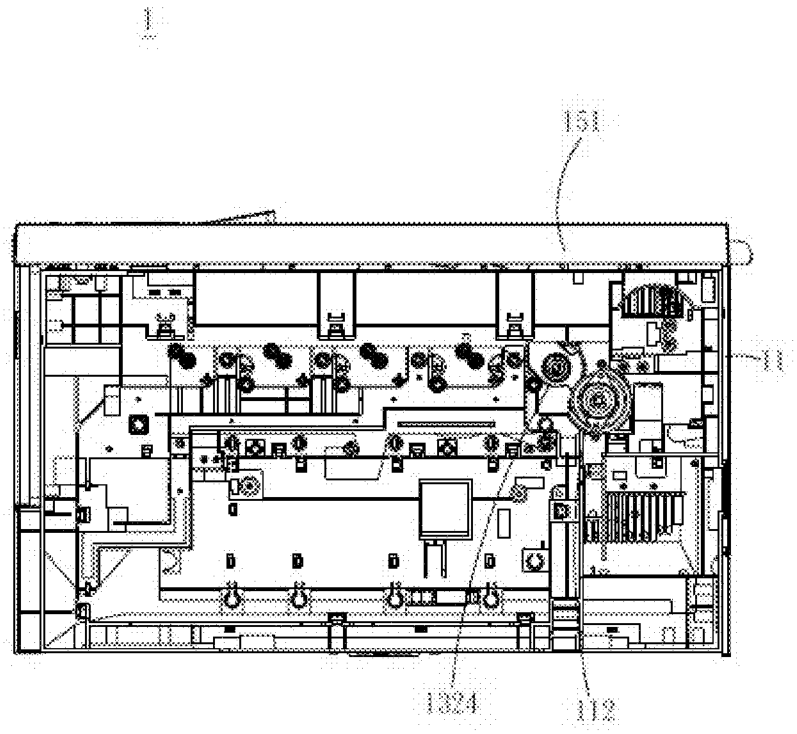
FIG. 7 is a side view of the structure of the printer of the present invention.
Figure 8:
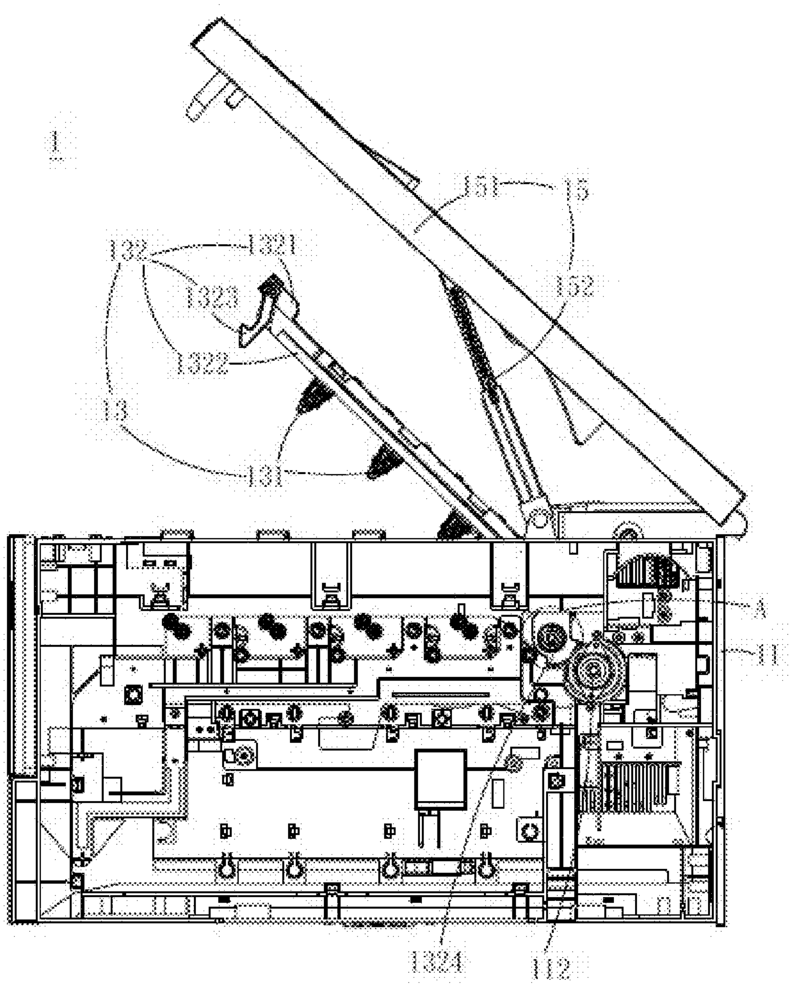
FIG. 8 is an exploded side view of the structure of the printer of the present invention.

Please refer to FIG. 5, and more specifically refer to FIG. 7 and FIG. 8. FIG. 7 is a structural side view of the printer of the present invention, and FIG. 8 is another structural side view. The light source frame 132 further includes two gear units 1324, and the two gear units 1324 are respectively located at the two ends of the second frame 1322 away from the two hook units 1323. The chassis 11 includes two gear parts 112, and the two gear units 1324 mesh and rotate with the two gear parts 112, wherein the two gear units 1324 limit the rotation of the two gear parts 112, and the light source frame 132 of the light source component 13 maintains a fixed angle relative to the notch of the receptacle 111. Thus, by the relative rotation of the two gear units 1324 and the two gear parts 112, the two gear units 1324 and the two gear parts 112 generate a damping and limiting effect on each other, allowing the two gear units 1324 and the two gear parts 112 to be fixed so as to maintain the fixed angle of the light source frame 132 relative to the notch of the receptacle 111.

Furthermore, the cover assembly 15 includes a plate body 151 and two support rods 152; one side of the plate body 151 is pivotally attached to one side of the chassis 11, one end of the two support rods 152 is respectively supported on the two sides of the chassis 11, and the other end of the two support rods 152 are respectively supported on the two sides of the plate body 151. The support rod 152 includes a wedge damping ring so that the plate body 151 of the cover assembly 15 produces slight resistance in the opening process. When the cover assembly 15 is continuously opened to the widest angle, a fastener prevents the plate body 151 from falling due to its own weight, providing an auxiliary support effect, and the plate body 151 of the cover assembly 15 maintains a fixed angle relative to the notch of the receptacle 111. When the plate body 151 of the cover assembly 15 is closed, a slight application of pressure causes the fastener to detach, and the plate body 151 descends slowly due to the resistance in the downward direction produced by the wedge damping ring to prevent the plate body 151 from closing too fast and injuring the fingers.

Figure 9:
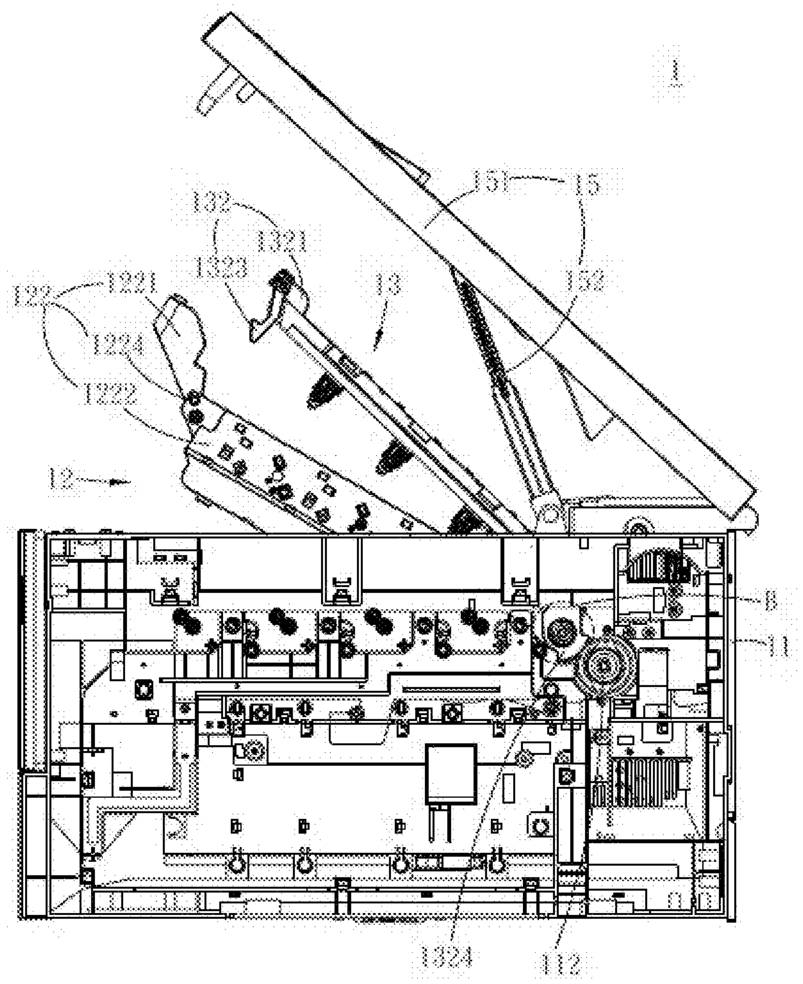
FIG. 9 is another exploded side view of the structure of the printer of the present invention.

Please refer to FIG. 7 to FIG. 9. FIG. 7 is a structural side view of the printer of the present invention, FIG. 8 is an exploded side view, and FIG. 9 is another exploded side view. As shown in the figure, in the present embodiment, if the user wants to maintain or replace the internal components of the photosensitive component 12, such as replacing the photosensitive drum, the user can first open the plate body 151 of the cover assembly 15. After the plate body 151 is opened, the support rods 152 on two sides will automatically support the plate body 151 and the chassis 11. The plurality of toner cartridges 14 are arranged and assembled in the receptacle 111 of the chassis 11, and the plurality of toner cartridges 14 are removed in sequence from the first gap 120 of the photosensitive frame 122 and the second gap 130 of the light source frame 132 (such as the removal method for the toner cartridge 14 shown in FIG. 5).

Furthermore, after the two hook units 1323 of the light source frame 132 are lifted from the two ends of the fixing rod 1224 of the photosensitive frame 122, the hook units 1323 are separated from the two ends of the fixing rod 1224. Since the light source frame 132 is provided with a torsion spring, it can pop up after the hook units 1323 are separated from the fixing rod 1224 (as shown in FIG. 8). At this time, the user can perform simple maintenance or replace the components of the photosensitive component 12. Furthermore, by using the grip unit 1221 to lift the photosensitive component 12, the photosensitive component 12 can be directly removed from the receptacle 111 at a specific angle relative to the notch of the receptacle 111, allowing the user to easily maintain or replace the components of the photosensitive component 12.

Furthermore, if the user wants to troubleshoot a paper output problem or a paper jamming problem in the printer 1, then after the user opens the plate body 151 of the cover assembly 15, all that is needed is to use one hand to lift the grip unit 1221 of the photosensitive component 12, which can simultaneously lift the photosensitive component 12 and the light source component 13 fixed on the photosensitive component 12 such that the photosensitive component 12 and the light source component 13 maintain a right angle relative to the notch of the receptacle 111; thus, the internal paper printing output mechanism and path in the receptacle 111 of the printer 1 can be directly exposed. At this point, the problem of troubleshooting paper output or paper jamming can be simply eliminated. The abovementioned process does not require any disassembly steps, such as removal of the toner cartridge 14 or removal of the light source component 13 from the photosensitive frame 122 and so on.

Figure 10:
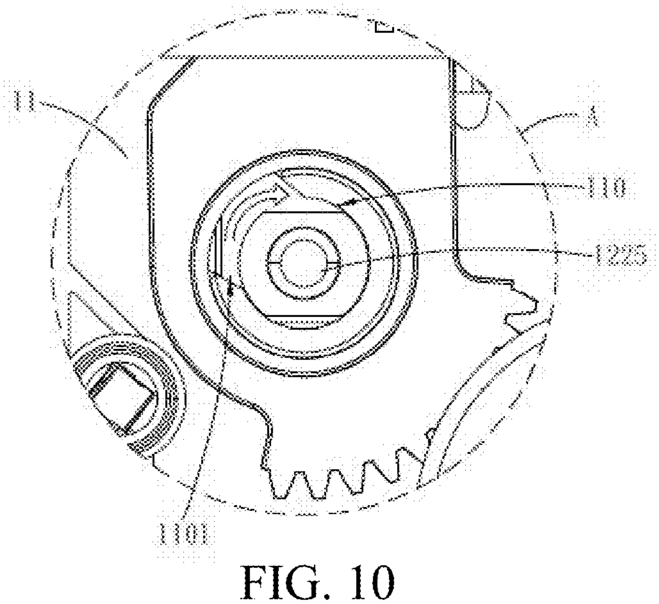
FIG. 10 is an enlarged view of area A in FIG. 8.
Figure 11:
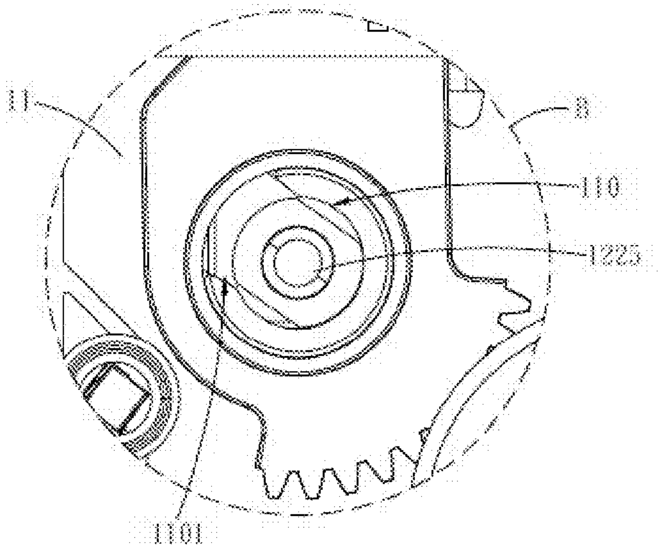
FIG. 11 is an enlarged view of area B in FIG. 9.

Please refer again to FIG. 6, and also refer to FIG. 10 and FIG. 11 together. FIG. 10 is an enlarged view of the region marked A in FIG. 8, and FIG. 11 is an enlarged view of the region marked B in FIG. 9. As shown in the figures, in this embodiment, the photosensitive frame 122 further includes a photosensitive shaft 1225, which is pivotally connected to the pivot hole 110 of the chassis 11, and the pivot hole 110 includes an opening 1101. The user can further pull the grip unit 1221 to lift the photosensitive frame 122 such that the photosensitive frame 122 can first be inclined to a removal angle, and at the removal angle of the photosensitive frame 122, the photosensitive shaft 1225 is also rotated such that the rotational outer periphery of the photosensitive shaft 1225 is corresponded to the opening 1101 of the pivot hole 110. In the process of removal of the photosensitive frame 122, the photosensitive shaft 1225 is removed along the opening 1101 of the pivot hole 110. In this way, without disassembly of the light source frame 132, the photosensitive component 12 can be removed from the receptacle 111 of the chassis 11.

In this embodiment, the printer of the present invention provides an integrated light source module 10; the integrated light source module 10 comprises the aforementioned photosensitive component 12, the light source component 13 and the plurality of toner cartridges 14. Via an integrated design, the light source component 13 is located in the assembly gap of the photosensitive component 12 and the toner cartridge 14 and integrated into an easy-to-assemble and -disassemble integrated light source module 10 to improve the structural design of the printer.

In summary, the present invention can avoid the problem of the light source component on the conventional cover bottom being difficult to smoothly close due to its structure relative to the toner cartridges in the receptacle of the chassis. To put it more specifically, due to the improvement of the structural design of the interior of the printer, the size of the toner cartridges can be further increased. In addition, when the paper in the printer is jammed, the integrated light source module can be maintained at a fixed angle relative to the notch of the receptacle of the chassis by the design of the gear units of the light source frame such that the user can directly deal with the jammed paper. Furthermore, the photosensitive component can be removed from the receptacle of the chassis inside the printer without disassembly of the light source frame in the above-described manner.

What is claimed is:

1. A printer, comprising:

a chassis, comprising a receptacle;

a photosensitive component, located in the receptacle, wherein the photosensitive component comprises a plurality of photosensitive drums and a photosensitive frame, the plurality of photosensitive drums being disposed on the photosensitive frame;

a light source component, located on the photosensitive component, wherein the light source component comprises a plurality of light source units and a light source frame, the plurality of light source units are disposed on the light source frame, and the plurality of light source units are respectively corresponded to the plurality of photosensitive drums;

a plurality of toner cartridges, inserted into a plurality of spaces in the photosensitive component and the light source component, wherein the plurality of toner cartridges are respectively corresponded to the plurality of photosensitive drums and the plurality of light source units; and a cover assembly, located on the chassis, wherein the cover assembly covers the receptacle, and the cover assembly is located above the plurality of toner cartridges.

2. The printer as claimed in claim 1, wherein the photosensitive frame further comprises a grip unit, two side panel frames and a fixing frame; two ends the grip unit are respectively fixed to one end of the two side panel frames, two ends of the fixing frame are respectively fixed to the other end of the two side panel frames, two ends of each of the plurality of photosensitive drums are located on the two side panel frames, the plurality of photosensitive drums are located between the grip unit and the fixing frame, and the plurality of photosensitive drums are separated by a first gap.

3. The printer as claimed in claim 2, wherein the light source frame further comprises a first frame and two second frames; two ends of the first frame are respectively fixed to one end of the two second frames, two ends of each of the plurality of light source units are located on the two second frames, the plurality of light source units are located on one side of the first frame, and the plurality of light source units are separated by a second gap.

4. The printer as claimed in claim 3, wherein the first gap and the second gap are linked to each other, and one of the plurality of toner cartridges is correspondingly assembled in the first gap and the second gap.

5. The printer as claimed in claim 3, wherein the photosensitive frame further comprises a fixing rod; two ends of the fixing rod respectively pass through two ends of the two side panel frames, the light source frame further comprises two hook units, the two hook units are respectively located on two ends of the first frame, and the two hook units of the light source frame are fixed to the two ends of the fixing rod of the photosensitive frame.

6. The printer as claimed in claim 5, wherein the light source frame further comprises two gear units; the two gear units are respectively located on two ends of the second frame away from the two hook units, the chassis comprises two gear parts, and the two gear units mesh with the two gear parts, wherein the two gear parts limit the rotation of the two gear units, and the light source frame of the light source component maintains a fixed angle relative to a notch of the receptacle.

7. The printer as claimed in claim 1, wherein the cover assembly comprises a plate body and two support rods; one side of the plate body is pivotally attached to one side of the chassis, one end of the two support rods is respectively supported on two sides adjacent to the pivot side of the plate body, and the other end of the two support rods is respectively supported on two sides adjacent to the pivot side of the chassis.

8. An integrated light source module of a printer, comprising:

a photosensitive component, comprising a plurality of photosensitive drums and a photosensitive frame, wherein the plurality of photosensitive drums are disposed on the photosensitive frame;

a light source component, located on the photosensitive component, wherein the light source component comprises a plurality of light source units and a light source frame, the plurality of light source units are disposed on the light source frame, and the plurality of light source units are respectively corresponded to the plurality of photosensitive drums; and a plurality of toner cartridges, inserted into a plurality of spaces between the photosensitive component and the light source component, wherein the plurality of toner cartridges are respectively corresponded to the plurality of photosensitive drums and the plurality of light source units.

9. The integrated light source module of the printer as claimed in claim 8, wherein the photosensitive frame further comprises a grip unit, two side panel frames and a fixing frame; two ends the grip unit are respectively fixed to one end of the two side panel frames, two ends of the fixing frame are respectively fixed to the other end of the two side panel frames, two ends of each of the plurality of photosensitive drums are located on the two side panel frames, the plurality of photosensitive drums are located between the grip unit and the fixing frame, and the plurality of photosensitive drums are separated by a first gap.

10. The integrated light source module of the printer as claimed in claim 9, wherein the light source frame further comprises a first frame and two second frames, two ends of the first frame are respectively fixed to one end of the two second frames, two ends of each of the plurality of light source units are located on the two second frames, the plurality of light source units are located on one side of the first frame, and the plurality of light source units are separated by a second gap.

11. The integrated light source module of the printer as claimed in claim 10, wherein the first gap and the second gap are linked to each other and one of the plurality of toner cartridges is correspondingly assembled in the first gap and the second gap.

12. The integrated light source module of the printer as claimed in claim 10, wherein the photosensitive frame further comprises a fixing rod, and two ends of the fixing rod respectively pass through two ends of the two side panel frames; the light source frame further comprises two hook units, the two hook units are respectively located on two ends of the first frame, and the two hook units of the light source frame are fixed to the two ends of the fixing rod of the photosensitive frame.

* * * * *